US011353873B2

(12) United States Patent (10) Patent No.: US 11,353,873 B2
Lacaze et al. (45) Date of Patent: Jun. 7, 2022

(54) AUTONOMOUS STREET SWEEPER VEHICLE

(71) Applicant: Robotic Research OpCo, LLC, Clarksburg, MD (US)

(72) Inventors: Alberto Daniel Lacaze, Potomac, MD (US); Karl Nicholas Murphy, Rockville, MD (US)

(73) Assignee: ROBOTIC RESEARCH OPCO, LLC, Clarksburg, MD (US)

( * ) Notice: Subject to any disclaimer, the term of this patent is extended or adjusted under 35 U.S.C. 154(b) by 254 days.

(21) Appl. No.: 16/563,157

(22) Filed: Sep. 6, 2019

(65) Prior Publication Data

US 2021/0072749 A1 Mar. 11, 2021

(51) Int. Cl.
*G05D 1/00* (2006.01)
*G05D 1/02* (2020.01)

(52) U.S. Cl.
CPC ......... *G05D 1/0088* (2013.01); *G05D 1/0055* (2013.01); *G05D 1/0257* (2013.01); *G05D 1/0278* (2013.01); *G05D 2201/0203* (2013.01)

(58) Field of Classification Search
CPC .. G05D 1/0088; G05D 1/0055; G05D 1/0257; G05D 1/0278; G05D 2201/0203
See application file for complete search history.

(56) References Cited

U.S. PATENT DOCUMENTS

| | | | |
|---|---|---|---|
| 2012/0072051 A1* | 3/2012 | Koon | 701/2 |
| 2018/0148900 A1* | 5/2018 | Rohrbaugh | E01H 1/103 |
| 2018/0326982 A1* | 11/2018 | Paris | B60W 30/0956 |
| 2019/0041860 A1* | 2/2019 | Jones | G05D 1/0212 |
| 2019/0049968 A1* | 2/2019 | Dean | G05D 1/0088 |
| 2019/0113927 A1* | 4/2019 | England | G05D 1/0217 |
| 2019/0205675 A1* | 7/2019 | McGill | G06K 9/00825 |
| 2019/0235521 A1* | 8/2019 | Mudalige | |

* cited by examiner

*Primary Examiner* — Elaine Gort
*Assistant Examiner* — Anthony M Gartrelle
(74) *Attorney, Agent, or Firm* — RowanTree Law Group, PLLC; Frederick F. Rosenberger

(57) ABSTRACT

One or more autonomous street sweeper vehicles can perform a variety of sweeping functions, such as sweeping, vacuuming, blowing, and scraping. Each autonomous street sweeper vehicle can be designed to follow routes and can comprise an autonomous vehicle that includes a drive by wire kit, a database storing the routes, a detection mechanism, and a control system that controls the vehicle to follow the routes while maintaining serviceable distances to the curb. In a convoy of multiple autonomous street sweeper vehicles, the vehicles in the convoy can communicate with each other, and each of the autonomous street sweeper vehicles can perform a different function. In some examples, a speed of the vehicle and/or settings of the cleaning equipment can be adjusted, for example, based on road hazards or amount of debris.

21 Claims, 9 Drawing Sheets

Basic System

AUTONOMOUS STREET SWEEPER VEHICLE

CROSS-REFERENCES TO OTHER APPLICATIONS

None.

FIELD OF THE INVENTION

This invention pertains to the development of an autonomous street sweeper vehicle that is designed to perform a variety of functions such as sweeping, vacuuming, blowing, scraping, and other such functions.

BACKGROUND

The statements in this section merely provide background information related to the present disclosure and may not constitute prior art.

Robotic devices may function autonomously or semi-autonomously by receiving instructions from a user or a remote device. Robotic devices can be used to perform various tasks, including transporting items.

There have been no reports in the patent literature on the development of an autonomous street sweeper vehicle that is designed to follow routes that is comprised of an autonomous vehicle that includes a drive by wire kit, a database storing the collection routes, a mechanism for detecting the curb, pedestrians, cars, and other road obstacles, and a control system that controls the autonomous vehicle to follow routes while maintaining the autonomous vehicle at serviceable distances to the curb that improve the efficiency of the sweeper.

SUMMARY OF THE INVENTION

The present invention involves the development of an autonomous street sweeper vehicle designed to perform many of the functions of the vehicle without the use of humans such as sweeping, vacuuming, blowing, or scraping.

It is designed to follow routes that is comprised of an autonomous truck that includes a drive by wire kit, a database storing the collection routes, a mechanism for detecting the curb, pedestrians, cars, and other road obstacles, and a control system that controls the autonomous truck to follow routes while maintaining the autonomous vehicle at serviceable distances to the curb that improve the efficiency of the sweeper.

There is a lead autonomous or manned vehicle which can be either functional or unfunctional that leads a convoy of autonomous street sweeper vehicles which have a variety of different functions such as scraping, blowing, sweeping, and vacuuming. The autonomous street sweeper vehicle adjusts its speed and cleaning equipment settings to avoid damage from road hazards and resume original position upon clearing the road hindrance.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

DETAILED DESCRIPTION OF INVENTION

Figure 1:
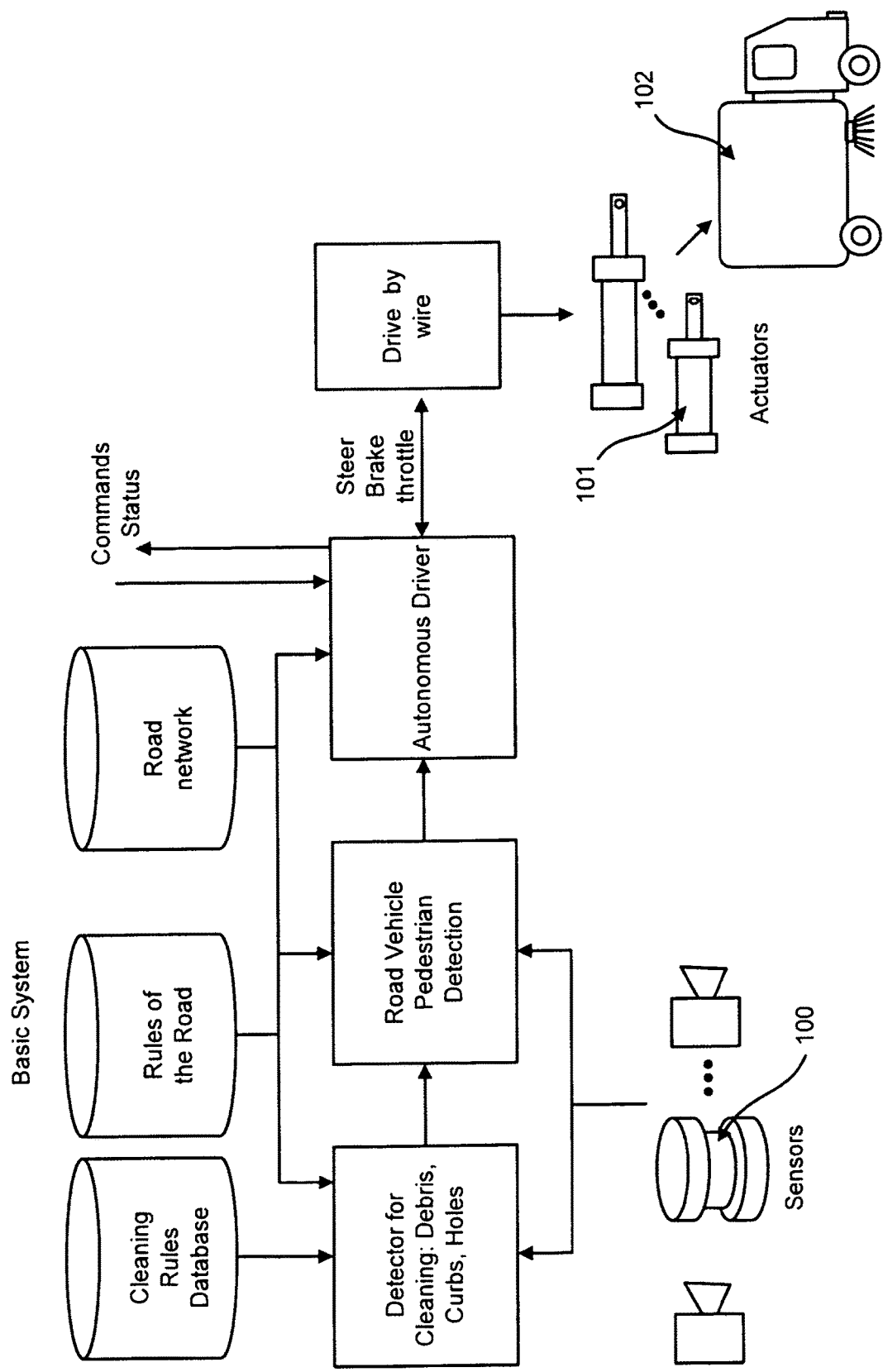
FIG. 1—Schematic of the overall basic system for the autonomous street sweeper vehicle.

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

This invention involves the development of an autonomous street sweeper vehicle that is designed to follow routes that comprises an autonomous vehicle that includes a drive by wire kit, a database storing the collection routes, a mechanism for detecting the curb, pedestrians, cars, and other road obstacles, a control system that controls the vehicle to follow routes while maintaining the truck at serviceable distances in the curb that improve the efficiency of the sweeper.

In the automotive industry, a drive-by-wire kit involves the use of electrical or electromechanical systems for performing vehicle functions that are traditionally achieved by mechanical linkages. This technology replaces the traditional mechanical control systems with electronic control systems using electromechanical actuators and human-machine interfaces such as pedal and steering feel emulators.

In this system, multiple autonomous cleaning vehicles are convoyed to provide for a wide variety of different functionalities such as sweeping, vacuuming, blowing, scraping, and other types of cleaning.

In this system, the autonomous vehicle or vehicles in the convoy follow a leader vehicle which may be manned or unmanned. If the leader vehicle is a manned vehicle, then a smaller vehicle such as a pickup truck or a small car could be used which does not require the use of a CDL license.

A CDL license is a commercial driver's license which is required to drive commercial motor vehicles (CMVs) such as tractor trailers, semi-trucks, dump trucks, other types of trucks, and passenger buses.

In this system, the autonomous vehicle adjusts the sideways separation distances with respect to the route being followed depending on cars parked by the side of the road or other road hazards. In addition, the system may consider vehicle size and effect of the actuators and their effects.

An actuator is a component of a machine that is responsible for moving and controlling a mechanism or system, for example by opening a valve.

In this system, the vehicle automatically creates extra separation distances from areas that the sweeping may create problems such as windows that may crack with debris from the blower, mailboxes that may be affected by the sweeper, etc.

In this system, the autonomous vehicle is equipped with sensors that detect if an obstacle is on the route and a controller that automatically stops if the a-priori routes are blocked.

In the system, the controller is aware of the rules of the road and the vehicle automatically obeys the rules of the road.

In this system, the location of the road features is sensed using different techniques such as GPS, ranging radios, LADAR, stereo vision, EO, or IR camera.

GPS refers to Global Positioning System and is a satellite-based navigation system made up of at least 24 satellites. It works in any weather conditions, anywhere in the world and 24 hours a day. The U.S. Department of Defense (USDOD) originally put the satellites into orbit for military use, but they were made available for civilian use in the 1980s. The GPS satellites circle the Earth twice a day in a precise orbit. Each satellite transmits a unique signal and orbital parameters that allow GPS devices to decode and compute the precise location of the satellite. GPS receivers use this information and trilateration to calculate a user's exact location. Essentially, the GPS receiver measures the distance to each satellite by the amount of time it takes to receive a transmitted signal.

Ranging radios are radio frequency (RF) based systems. Radio frequency (RF) is the oscillation rate of an alternating electric current or voltage or of a magnetic, electric or electromagnetic field or mechanical system in the frequency range from around twenty thousand times per second (20 kHz) to around three hundred billion times per second (300 GHz). This is roughly between the upper limit of audio frequencies and the lower limit of infrared frequencies. These are the frequencies at which energy from an oscillating current can radiate off a conductor into space as radio waves. Different sources specify different upper and lower bounds for the frequency range.

LADAR refers to Light Detection and Ranging System and it uses light to determine the distance to an object by illuminating the target with laser light and measuring the reflected light with a sensor. Differences in laser return times and wavelengths can then be used to make digital 3D representations of the target.

A stereo vision camera refers to a type of camera with two or more image sensors. This allows the camera to simulate human binocular vision and therefore gives it the ability to perceive depth. The depth-perceiving is done by a geometric approach called triangulation.

An EO camera is an electro-optical camera and consists of electronic detectors that convert light, or a change in light, into an electronic signal. EO imagery are photographic stills that are captured by using an electro-optical sensor (a high-resolution camera equipped with a telephoto zoom lens) that detects the magnitude and color of emitted or reflected light and records the information as pixels.

An infrared camera is a non-contact device that detects infrared energy (heat) and converts it into an electronic signal, which is then processed to produce a thermal image on a video monitor and perform temperature calculations.

In this system, the truck functionality is halted during particular road features. An example would be that the curb sweeper may only be run when the vehicle is engaged with the curb and stopped when the truck is crossing an intersection or separating from the curb to avoid a vehicle.

In the system that is developed, the functionality of the truck and speed of the truck is controlled by the amount of debris. If the vehicle can sense the amount of debris, the system may slow down to allow for effective cleaning.

In the system, the control system on the second and other trucks in the convoy have a reduced set of sensors, assuming that the first vehicle in the convoy is performing the obstacle and curb detection.

In this system, the first vehicle in the convoy, which is either manned or unmanned, takes into consideration the size of the whole convoy when deciding if it can cross a road or make a turn as to minimize the separation of the convoy.

In the system, the different vehicles in the convoy have a communication system that allows them to relay their position and use this position to maintain overall convoy speed. In this system, the trucks in the convoy maintain separation distances using a direct measurement of these distances used with uwb ranging radios, ladar, laser measurement, ultrasonics, stereo vision, structured light, and other such techniques.

UWB ranging radios are referred to as ultra-wideband, ultra-wide band and ultraband and are a radio technology that can use a very low energy level for short-range, high-bandwidth communications over a large portion of the radio spectrum. UWB has traditional applications in non-cooperative radar imaging.

Lasers are devices that generate an intense beam of coherent monochromatic light (or other electromagnetic radiation) by stimulated emission of photons from excited atoms or molecules. Lasers are used in drilling and cutting, alignment and guidance, and in surgery; the optical properties are also used in holography, reading bar codes, and in recording and playing compact discs.

Ultrasonics is the science and applications of ultrasonic waves. Ultrasound is acoustic (sound) energy in the form of waves having a frequency above the human hearing range. The highest frequency that the human ear can detect is approximately 20 thousand cycles per second (20,000 Hz). This is where the sonic range ends, and where the ultrasonic range begins.

Structured light is the process of projecting a known pattern (often grids or horizontal bars) on to a scene. The way that these deform when striking surfaces allows vision systems to calculate the depth and surface information of the objects in the scene, as used in structured light 3D scanners.

In this system, the controller in the truck senses the amount of debris in the truck by some of the vehicles in the convoy and the information is relayed to other vehicles in the convoy. The controller either senses or has stored in the database a list of areas that should not be cleaned because they may cause damage to the cleaning device, rumble strips, manhole covers, potholes, etc.

Rumble strips are a series of raised strips across a road or along its edge, changing the noise a vehicle's tires make on the surface and so warning drivers of speed restrictions or of the edge of the road.

A manhole cover is a removable plate forming the lid over the opening of a manhole, which is an opening large enough for a person to pass through that is used as an access point for maintenance and other work on an underground utility vault or pipe.

A pothole is a depression in a road surface, usually asphalt pavement, where traffic has removed broken pieces of the pavement. It is usually the result of water in the underlying soil structure and traffic passing over the affected area.

In the system that is developed, one of the vehicles in the convoy can detect a pothole and relay it to the other vehicles. The vacuum portion of the cleaning sensed or has knowledge in the database of manhole covers, and other covers that can be lifted with suction and avoids vacuuming those areas either by avoiding driving over or by changing the route.

In the system, one or more vehicles in the convoy senses a road imperfection or gap such as cow catchers, drawbridge junctions, water drains, and either stops sweeping (vacuuming) or positions the sweeper as to avoid damage to the truck functionality.

A cow catcher is a metal frame at the front of a locomotive for pushing aside cattle or other obstacles on the line. A drawbridge or drawbridge is a type of movable bridge typically at the entrance to a castle or tower surrounded by a moat. A water drainage system is a system by which water is drained on or in the soil to enhance production. A sustainable drainage system is designed to reduce the potential impact of development.

FIG. 1 shows the overall basic system in which sensors (100) are used for detection of cleaning such as debris, curbs, and holes, and well as detection of roads, vehicles, and pedestrians. These sensed detections are connected to the databases containing the cleaning rules, rules of the road, and the road network and passed along to the autonomous driver which is given commands and issues out the status. The steer, brake, and throttle of the autonomous driver is controlled by the drive by wire kit that lead to the actuators (101) that are present in the autonomous street sweeper truck (102).

Figure 2:
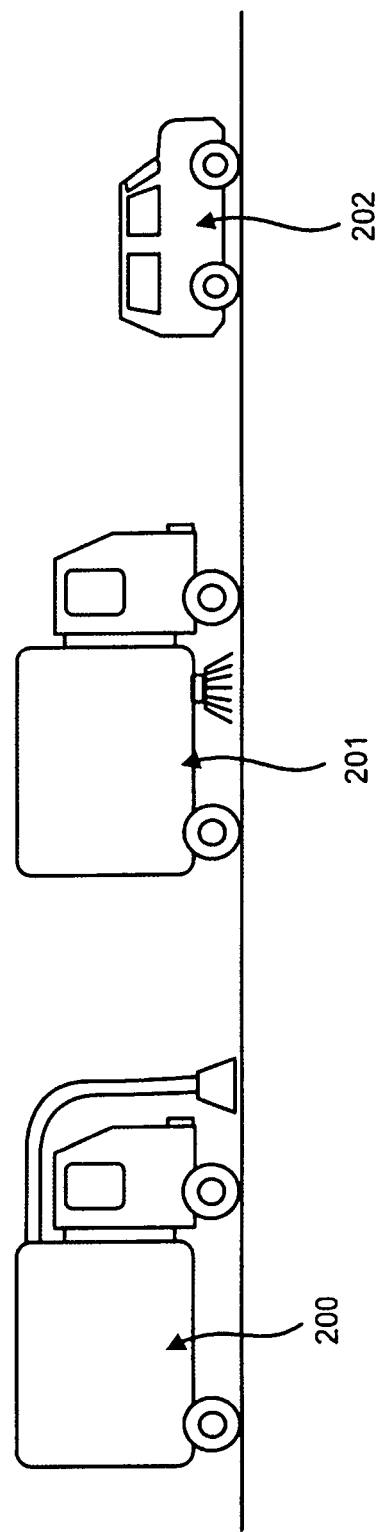
FIG. 2—Multiple trucks convoying to perform different functions which are led by a lead vehicle that is either autonomous or human driven.

FIG. 2 shows a case where two autonomous street sweeper vehicles (200, 201) convoy behind a lead manned or unmanned vehicle (202). In this case, the first autonomous street sweeper vehicle (201) behind the unmanned or manned lead vehicle (202) is performing the sweeping function while the second autonomous street sweeper vehicle (200) is performing the vacuuming function. In a similar manner, there can be various embodiments of different type of vehicles performing a variety of different tasks and functions such as blowing, scraping, vacuuming, and sweeping. In addition, the lead vehicle (202) could also perform one of the functions or it could simply be just the lead vehicle (202). In this particular example, the lead vehicle does not perform any function, but is not limited to this case. Also, the lead vehicle (202) could be a smaller vehicle that does not require a commercial driver's license (CDL).

Figure 3:
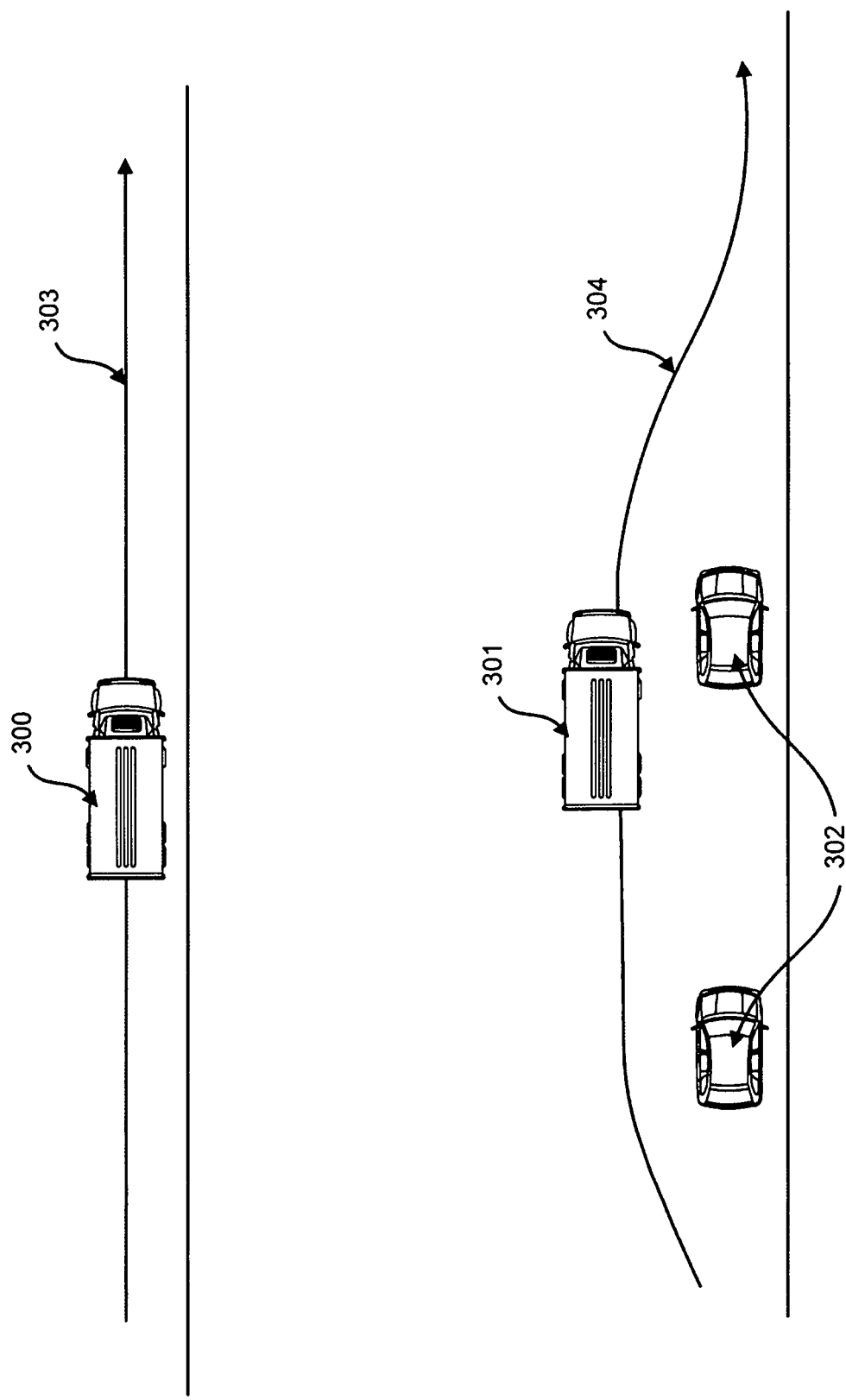
FIG. 3—Paths followed by the autonomous street sweeper vehicle when using the predetermined route or when there are obstacles present.

FIG. 3 shows two scenarios in which the top scenario shows the case where there are no obstacles present. In this case, the autonomous street sweeper vehicle (300) can follow the predetermined routes in the normal manner (303). In the bottom scenario, there are obstacles present such as the presence of parked cars (302) and the autonomous street sweeper vehicle must follow modified paths (304) to maneuver around the parked cars or the obstacles that are present.

Figure 4:
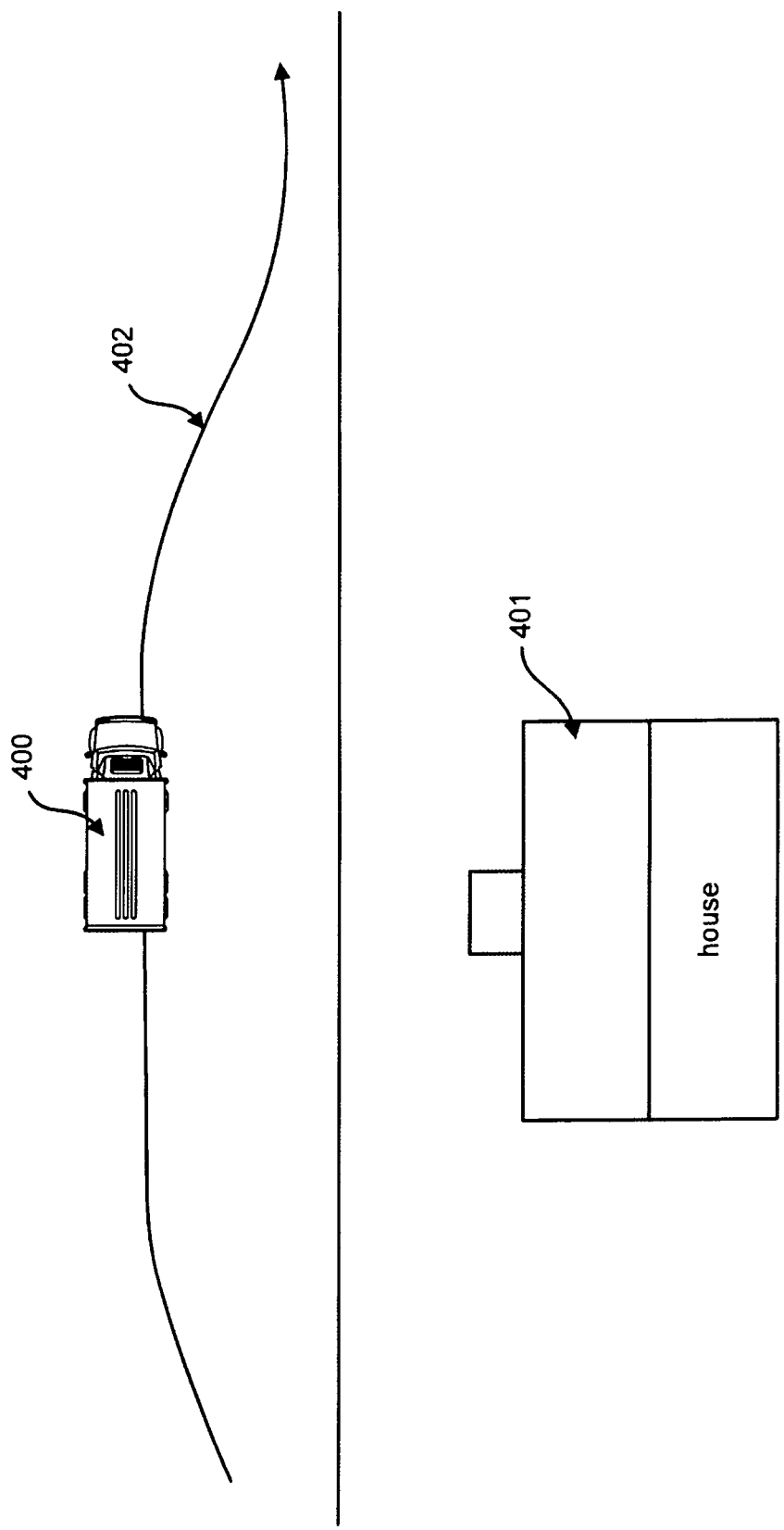
FIG. 4—The autonomous street sweeper vehicle staying a certain distance away from sensitive objects that might be damaged by the cleaning operations such as a house.

FIG. 4 shows an example in which the autonomous street sweeper vehicle (400) follows a modified path (402) by altering its path to stay a certain distance away from sensitive objects (401) that might be damaged by the cleaning operations. In this example, the autonomous street sweeper vehicle (401) alters its route (402) to stay away from the house (401) which could be damaged by the cleaning operations of the autonomous street sweeper vehicle (400).

Figure 5:
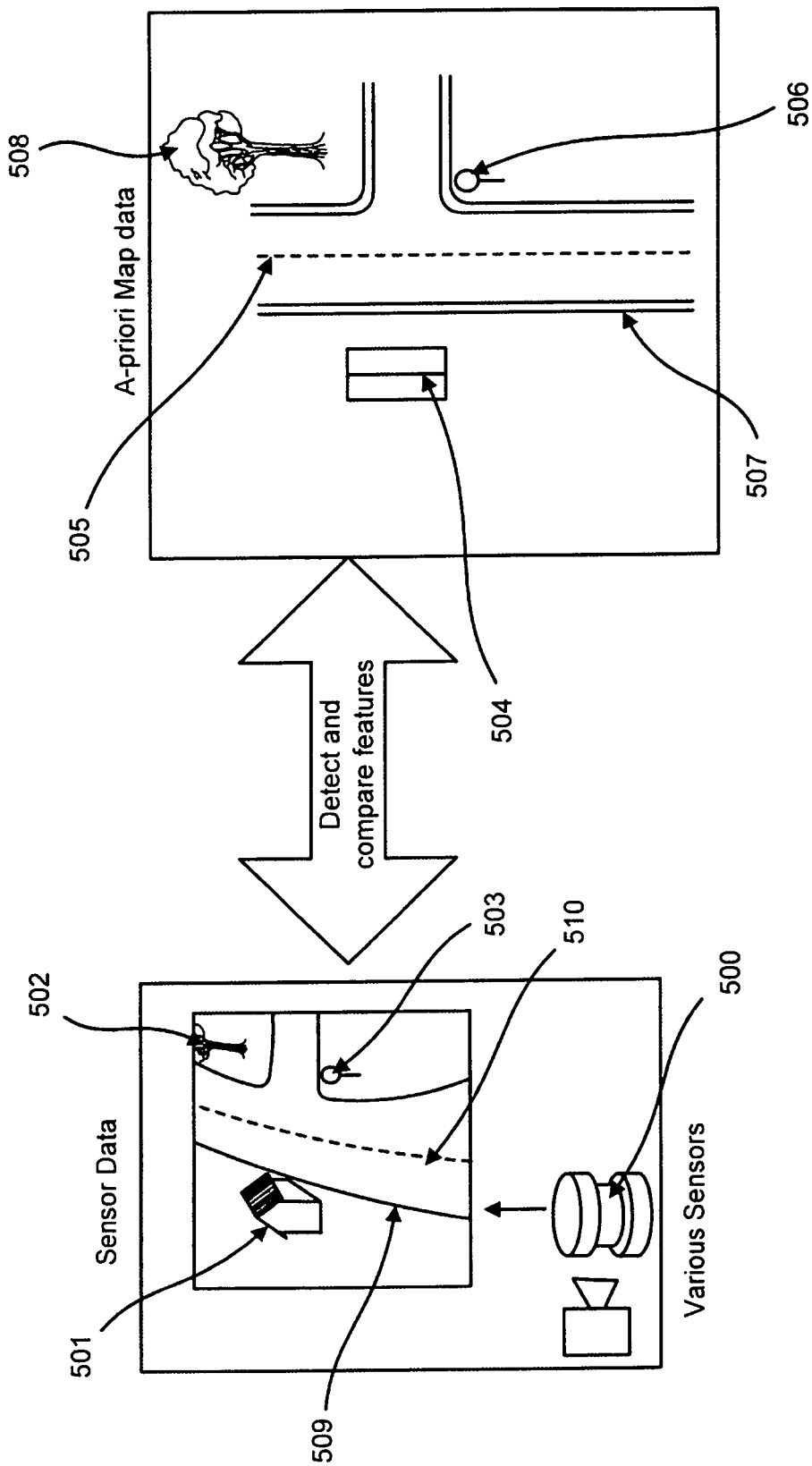
FIG. 5—A variety of sensors are used to detect the features and are compared to the A-priori map data that is stored in the database.

FIG. 5 shows the detection of features with various sensors (500) and comparison of the features to the a-priori map data. The sensors (500) detect the features and the left panel shows the sensor data of the features they detect such as the objects such as houses (501), trees (502), signs (503), curbs (509), and line markings (510) which is then compared to the a-priori map data stored in the database of the objects (504), curbs (507), line markings (505), trees (508), and signs (506).

Figure 6:
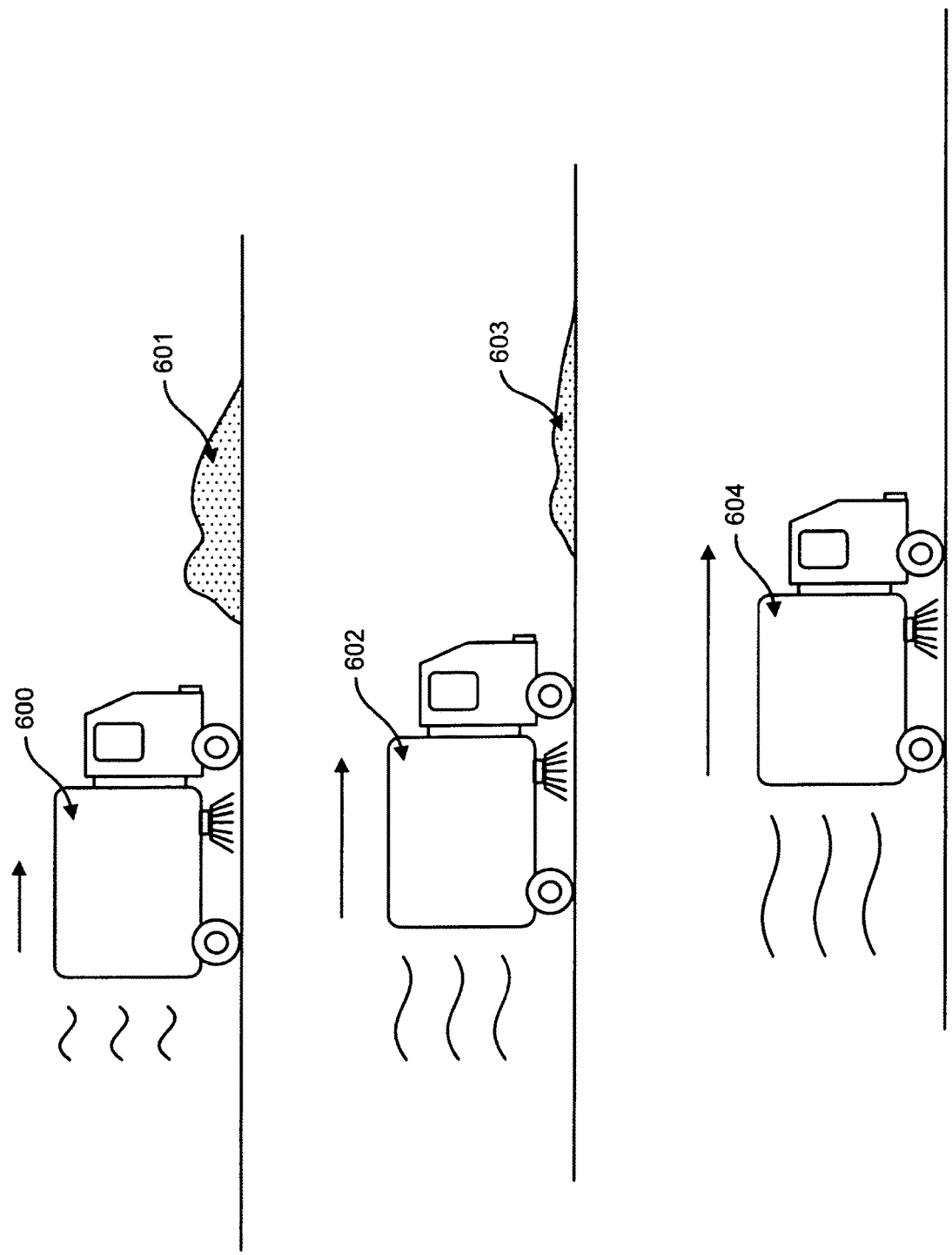
FIG. 6—Illustration of the adjustment of the speed of the autonomous vehicle based on the amount and type of debris that is present on the road.

FIG. 6 shows that the autonomous street sweeper vehicle adjusts its speed and/or sweeper settings depending on the amount and type of debris that is present in the road. It can be seen that out of the three autonomous street sweeper vehicles (600, 602, 604), the first autonomous street sweeper vehicle (600) goes at the slowest speed since there is a large amount of debris (601) that is present. It can be seen that the second autonomous street sweeper vehicle (602) goes at a faster speed than the first autonomous street sweeper vehicle (600) since there is less debris (603) that is present compared to the first case. The third autonomous street sweeper vehicle (604) goes at the fastest speed since there is no debris that is present in the road.

Figure 7:
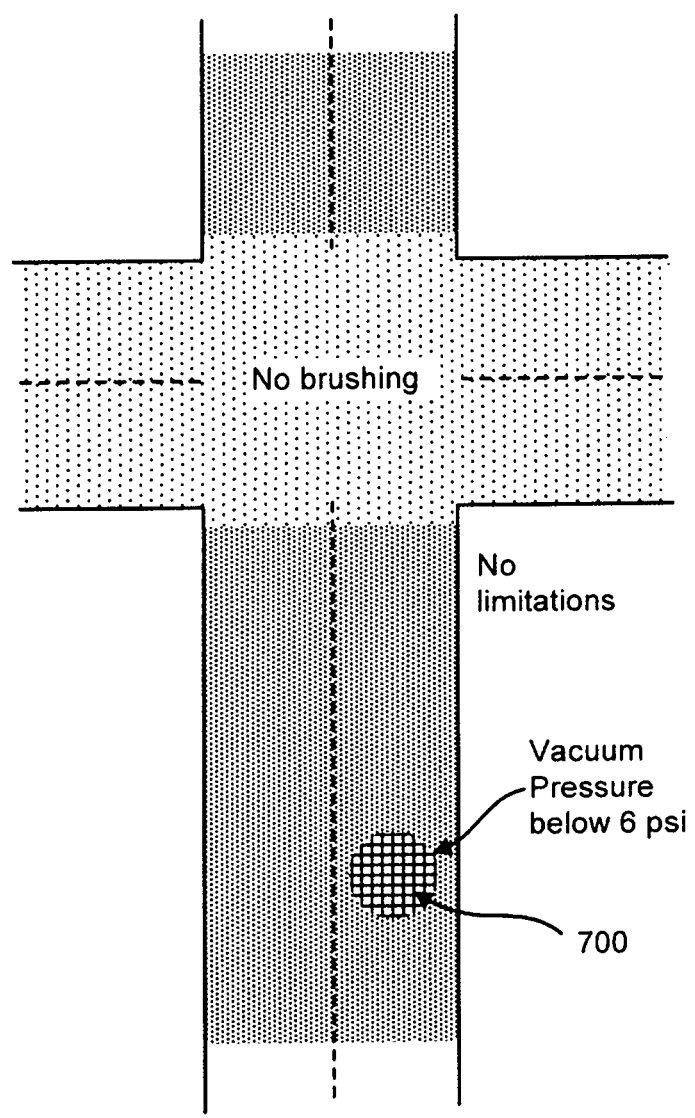
FIG. 7—Illustration of road surface in which a cleaning database is used to specify where various operations can be performed and in what particular types of settings.

FIG. 7 illustrates a road in which different specifications for the autonomous street sweeper vehicle are illustrated such as areas where no brushing should be conducted, areas where there are no limitations on the type of functions performed and areas where the vacuum should be done at pressure below 6 psi (700). A cleaning database can be used to store information on where various operations can be performed, and at which settings. This information can be pulled up from the database and used by the autonomous street sweeper vehicle during its operation in the road.

Figure 8:
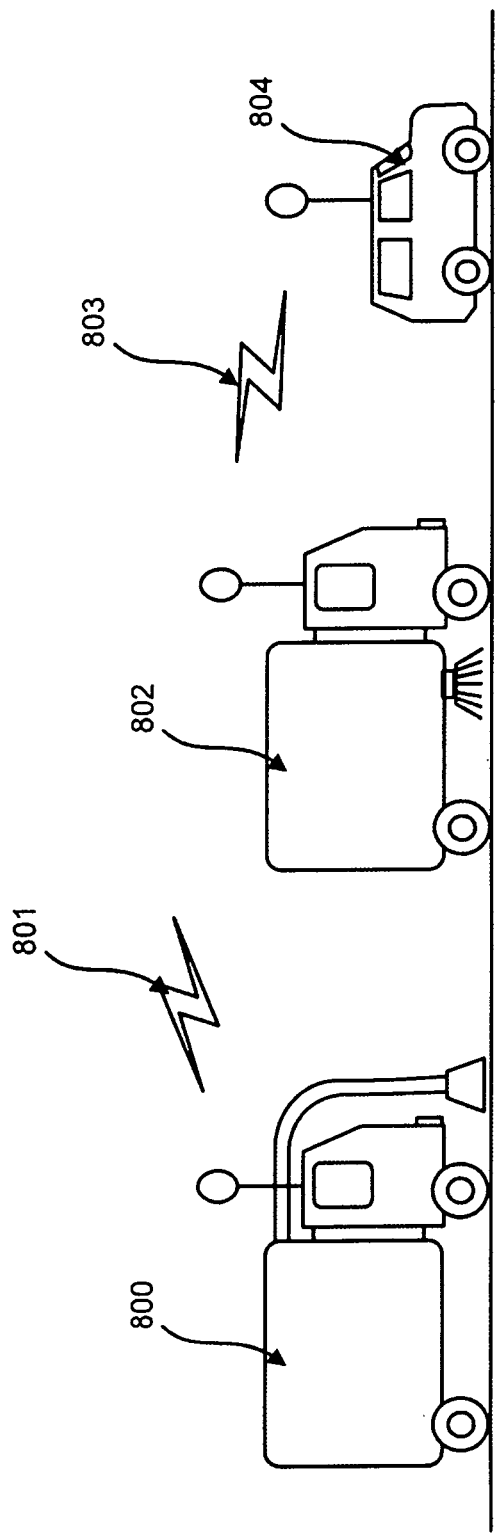
FIG. 8—The autonomous street sweeper vehicles may communicate with each other using radios or other methods.

FIG. 8 shows a lead autonomous vehicle (804) that is not functional that leads two autonomous vehicles (800, 802), in which one is the vehicle with the sweeping function (802), and the other is the one with the vacuuming function (800). The three vehicles in the convoy communicate with each other via a communication mechanism (801, 803) through the use of radios or other methods. The location and speed of each of the vehicles (800, 802, and 804) is shared to help maintain the overall convoy formation and speed. The information that is sensed by a lead vehicle can be shared with following vehicles, including the location, obstacles, road conditions, and debris location, type, and amount. Driving, cleaning, and other status can be shared between the vehicles.

Figure 9:
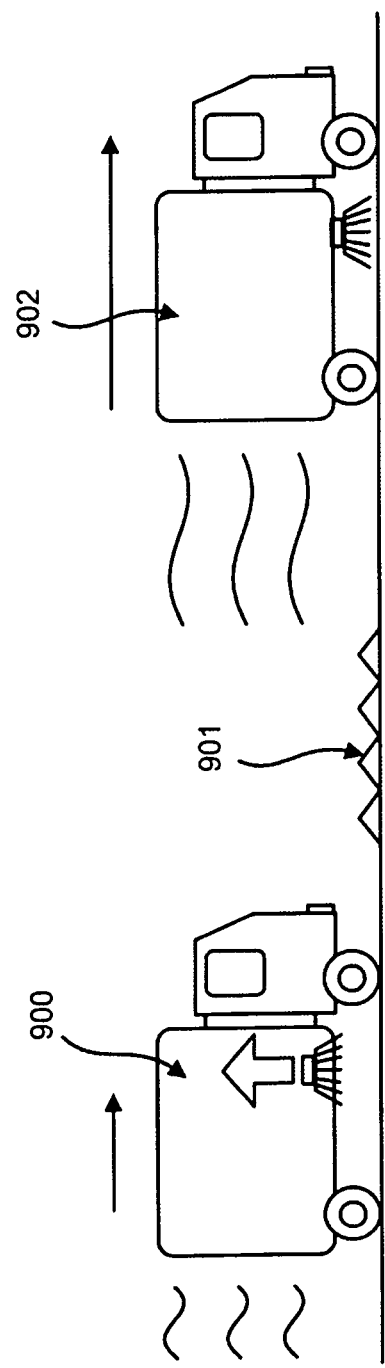
FIG. 9—The autonomous street sweeper vehicle adjusts vehicle speed or cleaning equipment position/settings depending on the road conditions to improve cleaning and/or protect the cleaning equipment.

FIG. 9 shows an example of an autonomous street sweeper in the left side (800) adjusting its speed by slowing down and moving the sweeper part upwards on the cleaning equipment based as a way of adjusting its settings based the road conditions such as the road hazard (901) to improve cleaning and/or protect the cleaning equipment. Then after passing through the road hazard (901), the autonomous street sweeper (902) resumes its normal vehicle speed and the sweeper positioned back to its normal setting.

The embodiments of the invention in which an exclusive property or privilege is claimed are defined as follows:

1. An autonomous street sweeper system comprising:
 a convoy of at least two autonomous cleaning vehicles, each cleaning vehicle providing a street cleaning function and comprising:
  a drive by wire kit;
  a database storing routes for the cleaning vehicle to follow;
  one or more sensors mounted on the cleaning vehicle and configured to detect a curb of a road, obstacles in the road, features proximal to the road, or any combination thereof; and
  a control system operatively coupled to the drive by wire kit, the database, and the one or more sensors,
  wherein the control system is configured to control, via the drive by wire kit, the cleaning vehicle to maintain a predetermined distance between the cleaning vehicle and a detected curb as the cleaning vehicle follows one of the routes,
 wherein the street cleaning function provided by a first of the at least two autonomous cleaning vehicles is different from the street cleaning function provided by a second of the at least two autonomous cleaning vehicles.

2. The autonomous street sweeper system of claim 1, wherein the street cleaning function of each cleaning vehicle comprises sweeping, vacuuming, blowing, or scraping.

3. The autonomous street sweeper system of claim 1, wherein:
 the convoy further comprises a manually-operated leader vehicle; and
 the control system of each cleaning vehicle is further configured to control, via the respective drive by wire kit, the cleaning vehicle to follow the manually-operated leader vehicle.

4. The autonomous street sweeper system of claim 1, wherein the control system of at least one of the cleaning vehicles is further configured to:
 detect, via the one or more sensors, an obstacle in the road, cars parked by the side of the road, or other road hazards; and
 control, via the drive by wire kit, the cleaning vehicle to increase the distance between the cleaning vehicle and the curb in response to the detecting the obstacle, cars, or other road hazards.

5. The autonomous street sweeper system of claim 1, wherein the control system of at least one of the cleaning vehicles is further configured to:
 detect, via the one or more sensors, one or more obstacles in the road;
 determine that the one or more obstacles block the route being followed by the cleaning vehicle; and
 automatically stop, via the drive by wire kit, the cleaning vehicle in response to the determination that the route is blocked.

6. The autonomous street sweeper system of claim 1, wherein, for each cleaning vehicle:
 the database further stores rules of the road; and
 the control system is further configured to control the cleaning vehicle, via the respective drive by wire kit, to follow the route while obeying the rules of the road.

7. The autonomous street sweeper system of claim 1, wherein the one or more sensors comprises one or more global positioning systems (GPS), one or more ranging radios, one or more laser detection and ranging systems (LADAR), one or more stereo vision systems, one or more electro-optic (EO) cameras, one or more infrared (IR) cameras, or any combination thereof.

8. The autonomous street sweeper system of claim 1, wherein the control system of one of the cleaning vehicles is further configured to:
 determine that the cleaning vehicle has or will disengage from a curb along the followed route; and
 control the cleaning vehicle to pause the respective street cleaning function while the cleaning vehicle is disengaged from the curb.

9. The autonomous street sweeper system of claim 1, wherein a number of sensors mounted on a lead vehicle in the convoy is greater than a number of sensors mounted on following vehicles in the convoy.

10. The autonomous street sweeper system of claim 1, wherein the control system of a lead vehicle in the convoy is configured to:
 determine an upcoming intersection or turn along the route; and
 control the lead vehicle to move through the intersection or make the turn based at least in part on a size of the whole convoy so as to minimize the separation of the convoy.

11. The autonomous street sweeper system of claim 1, wherein:
 each cleaning vehicle further comprises a communication system;
 the control system of each cleaning vehicle is operatively coupled to the respective communication system and configured to communicate with the control systems of other vehicles in the convoy via the communication system;
 the control systems are further configured to relay respective positions of the cleaning vehicles to the other vehicles in the convoy; and
 at least one of the control systems is configured to use the relayed positions to maintain an overall speed of the convoy.

12. The autonomous street sweeper system of claim 1, wherein, for each cleaning vehicle:
 the one or more sensors comprise at least one distance-measuring sensor configured to directly measure a distance from an adjacent vehicle in the convoy, the at least one distance-measuring sensor comprising one or more ultra-wideband (UWB) ranging radios, one or more laser detection and ranging systems (LADAR), one or more laser measurement systems, one or more ultrasonic sensors, one or more stereo vision systems, one or more structured light systems, or any combination thereof; and
 at least one of the control system is configured to control the vehicles in the convoy so as to maintain separation distances between adjacent vehicles based on the direct measurement.

13. The autonomous street sweeper system of claim 1, wherein:
 each cleaning vehicle further comprises a communication system;
 the control system of each cleaning vehicle is operatively coupled to the respective communication system and configured to communicate with the control systems of other vehicles in the convoy via the communication system;
 the control system of a leading vehicle in the convoy is configured to:
  detect, via the one or more sensors, an amount of debris in the road; and transmit, via the communication system, information regarding the detected amount of debris to other vehicles in the convoy.

14. The autonomous street sweeper system of claim 1, wherein, for at least one of the cleaning vehicles:
the database further stores information regarding (i) areas that should not be cleaned because they may cause damage to the cleaning vehicle, (ii) manhole covers or other roadway features susceptible to suction, (iii) road imperfections or roadway features forming a gap, or (iv) any combination of (i) through (iii); and
the control system is further configured to:
(a) control the cleaning vehicle, via the respective drive by wire kit, to avoid an area that should not be cleaned, a manhole cover or other roadway feature susceptible to suction, or a road imperfection or roadway feature forming a gap;
(b) control the cleaning vehicle to pause the respective street cleaning function while the cleaning vehicle is proximal to or disposed over the area that should not be cleaned, the manhole cover or other roadway feature susceptible to suction, or the road imperfection or roadway feature forming a gap;
(c) control a position of an end effector that performs the respective street cleaning function of the cleaning vehicle to avoid damage to the end effector while the cleaning vehicle is proximal to or disposed over the area that should not be cleaned, the manhole cover or other roadway feature susceptible to suction, or the road imperfection or roadway feature forming a gap; or
(d) any combination of (a) through (c).

15. The autonomous street sweeper system of claim 1, wherein:
each cleaning vehicle further comprises a communication system;
the control system of each cleaning vehicle is operatively coupled to the respective communication system and configured to communicate with the control systems of other vehicles in the convoy via the communication system;
at least one of the control systems is configured to:
detect, via the one or more sensors, a pothole along the route; and
transmit, via the communication system, information regarding the detected pothole to the other vehicles in the convoy.

16. The autonomous street sweeper system of claim 1, wherein, for at least one of the cleaning vehicles:
the control system is configured to detect, via the respective one or more sensors, (i) areas that should not be cleaned because they may cause damage to the cleaning vehicle, (ii) manhole covers or other roadway features susceptible to suction, (iii) road imperfections or roadway features forming a gap, or (iv) any combination of (i) through (iii); and
the control system is further configured to:
(a) control the cleaning vehicle, via the respective drive by wire kit, to avoid an area a detected area that should not be cleaned, a detected manhole cover or other roadway feature susceptible to suction, or a detected road imperfection or roadway feature forming a gap;
(b) control the cleaning vehicle to pause the respective street cleaning function while the cleaning vehicle is proximal to or disposed over the detected area that should not be cleaned, the detected manhole cover or other roadway feature susceptible to suction, or the detected road imperfection or roadway feature forming a gap;
(c) control a position of an end effector that performs the respective street cleaning function of the cleaning vehicle to avoid damage to the end effector while the cleaning vehicle is proximal to or disposed over the detected area that should not be cleaned, the detected manhole cover or other roadway feature susceptible to suction, or the detected road imperfection or roadway feature forming a gap; or
(d) any combination of (a) through (c).

17. The autonomous street sweeper system of claim 1, wherein, for at least one of the cleaning vehicles, the control system is configured to:
detect, via the respective one or more sensors, a street elevation profile along the route; and
raise or lower an end effector that performs the respective street cleaning function of the cleaning vehicle so as to conform to the detected street elevation profile.

18. The autonomous street sweeper system of claim 1, wherein:
the convoy further comprises a signaling vehicle that does not provide a street cleaning function, the signaling vehicle being configured to provide an indication to surrounding traffic regarding cleaning operations of the convoy; and
the signaling vehicle is either a first or last vehicle in the convoy.

19. The autonomous street sweeper system of claim 1, wherein:
the convoy further comprises an autonomous leader vehicle, the leader vehicle comprising:
a second drive by wire kit;
a second database storing routes for the leader vehicle to follow;
one or more second sensors mounted on the leader vehicle and configured to detect features of a road, obstacles within the road, structures proximal to the road, or any combination thereof; and
a second control system operatively coupled to the second drive by wire kit, the second database, and the one or more second sensors,
wherein the second control system is configured to control, via the drive by wire kit, the leader vehicle to follow a selected one of the stored routes; and
the control system of each cleaning vehicle is further configured to control, via the respective drive by wire kit, the cleaning vehicle to follow the autonomous leader vehicle along the selected one of the stored routes.

20. An autonomous street sweeper comprising:
a cleaning vehicle providing a street cleaning function;
a drive by wire kit installed in the cleaning vehicle;
a database storing routes for the cleaning vehicle to follow;
one or more sensors mounted on the cleaning vehicle and configured to detect a curb of a road, obstacles in the road, features proximal to the road, or any combination thereof; and
a control system operatively coupled to the drive by wire kit, the database, and the one or more sensors,
wherein the control system is configured to:
control, via the drive by wire kit, the cleaning vehicle to maintain a first distance between the cleaning vehicle and a detected curb of the road as the cleaning vehicle follows one of the routes;

detect, via the one or more sensors, a feature off of the road that may be affected by the street cleaning function; and further control, via the drive by wire kit, the cleaning vehicle to maintain a second distance greater than the first distance in response to detecting the feature.

21. An autonomous street sweeper comprising:

a cleaning vehicle providing a street cleaning function;

a drive by wire kit installed in the cleaning vehicle;

a database storing routes for the cleaning vehicle to follow;

one or more sensors mounted on the cleaning vehicle and configured to detect a curb of a road, obstacles in the road, features proximal to the road, or any combination thereof; and a control system operatively coupled to the drive by wire kit, the database, and the one or more sensors, wherein the control system is configured to:

control, via the drive by wire kit, the cleaning vehicle to follow one of the routes at a first speed;

detect, via the one or more sensors, an amount of debris within an upcoming section of a road along the route; and control, via the drive by wire kit, the cleaning vehicle to have a second speed different from the first speed based on the detected amount of debris.

* * * * *